May 12, 1953     M. MENNESSON     2,638,174
EXHAUST DEVICE FOR MOTOR BICYCLES
Filed Oct. 25, 1949     2 Sheets-Sheet 1

INVENTOR
MARCEL MENNESSON
BY
Bailey, Stephens & Huettig
ATTORNEYS

May 12, 1953  M. MENNESSON  2,638,174
EXHAUST DEVICE FOR MOTOR BICYCLES
Filed Oct. 25, 1949  2 Sheets-Sheet 2

INVENTOR
MARCEL MENNESSON
BY
Bailey, Stephens & Huettig
ATTORNEYS

Patented May 12, 1953

2,638,174

UNITED STATES PATENT OFFICE 2,638,174

EXHAUST DEVICE FOR MOTOR BICYCLES

Marcel Mennesson, Neuilly-sur-Seine, France, assignor to "Societe d'Appareils de Controle et d'Equipement des Moteurs" (S. A. C. E. M.) S. A. R. L., Seine, France, a society of France Application October 25, 1949, Serial No. 123,423
In France November 25, 1948

2 Claims. (Cl. 180—31)

The present invention relates to the exhaust devices of bicycles or other light vehicle auxiliary engines.

The exhaust gases of the auxiliary engines, when these engines are located at a relatively high level on the bicycle or other light vehicle, at the front or at the rear of the driver, must be conveyed to a close distance from the ground before they are allowed to escape into the atmosphere.

At the present time, this is obtained by means of a distinct tube starting from the muffler or from the engine and leading to a short distance from the ground. This visible tube is rather ugly, is cumbersome and must be fixed to adjacent parts of the bicycle through auxiliary fixation means. Furthermore, it is soon coated with oil, which is a danger for the cleanliness of anything that may come into contact therewith.

The chief object of my invention is to provide an exhaust device of this kind which is free from the above mentioned drawbacks and furthermore such that a simple and efficient connection is obtained between the fixed tubular portion of this device and the auxiliary engine to which this portion is attached even if the engine is to be movable with respect to this fixed portion, not only to permit its engagement or disengagement with the wheel tire, but also to permit elastic suspension thereof in the course of its operation.

My invention consists chiefly in placing the exhaust tube of the device in question in the mudguard of the vehicle wheel that is driven by the auxiliary engine.

A second feature of my invention consists in rigidly fixing the exhaust tube, on the one hand to the suspended engine, and, on the other hand to a portion of the frame or steering means of the vehicle with a distance between the points of fixation such that the natural elasticity of said tube permits of directly connecting it with the engine, despite the relative mobility thereof and in such manner that said tube constantly urges the engine toward the vehicle wheel when this wheel is driven by a roller elastically applied on said wheel.

A third feature consists in providing the exhaust tube of a device of the kind in question with means capable of acting as a silencer.

And a fourth feature consists in giving the portion of the exhaust tube provided in the mudguard a flat shape whereas the ends of said tube are left of circular section so that the upper end of said tube can be fitted in the muffler casting or can act as a socket for a swivel ball joint mounted on said muffler and that its lower end can be fitted with anti-dripping means.

Preferred embodiments of the present invention will be hereinafter described with reference to the accompanying drawings, given merely by way of example and in which.

Figure 1:
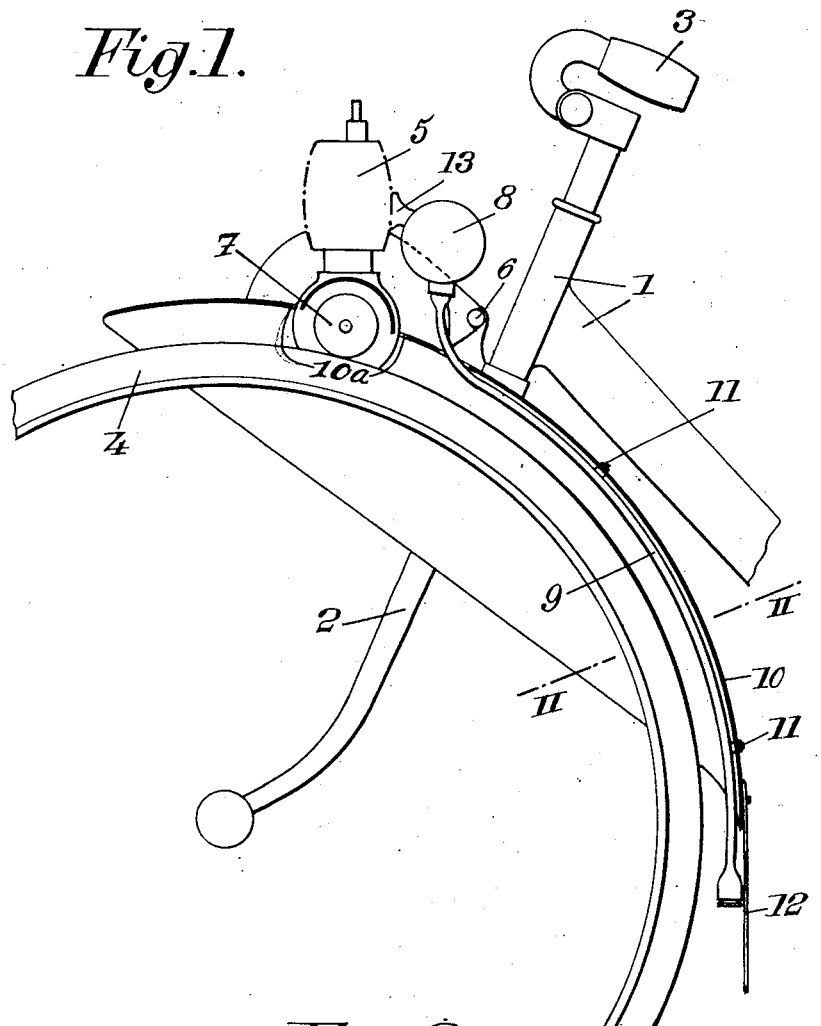
Figs. 1 and 2 show, respectively in vertical section and in transverse section on the line II—II of Fig. 1, an exhaust device made according to my invention.

The bicycle a portion of which is shown in Fig. 1, includes, among other elements, a frame 1, a front fork 2, a handle-bar 3 and a front wheel 4. It has been supposed, by way of example, that engine 5 is located above wheel 4 and that it is hinged to fork 2 by means of a pivot 6, to drive the vehicle by means of a roller 7 running on the tire of wheel 4. A mud-guard 10 surrounding a portion of wheel 4 is carried by fork 2. This mud-guard is provided with a hole 10a through which roller 7 and parts attached to engine 5 can pass freely when roller 7 is lifted from its position shown by the drawing by rotation of engine 5 about pivot 6.

The engine includes an exhaust pipe 13 opening into a muffler 8 in communication with exhaust tube 9.

Figure 2:
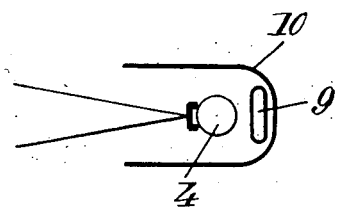
Figure 3:
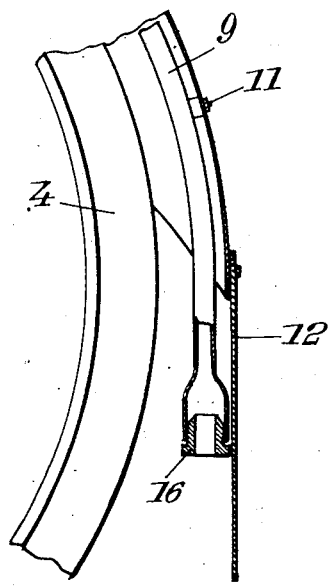
Fig. 3 shows, similarly to Fig. 1 but on an enlarged scale (with parts in section), the lower portion of this exhaust device.

According to my invention, in the case of Figs. 1 to 3, exhaust tube 9 is housed in the mud-guard 10, being fixed to the inner wall thereof through suitable rigid means, for instance rivets or bolts 11, brackets, or clips, or by welding, etc. Tube 9 passes through mud-guard 10 at the upper part thereof (owing to the provision, in said mud-guard, of a hole through which tube 9 can move freely) and extends therealong, between said mud-guard and the tire so as to lead to a short distance from the ground, beyond the lower edge of the mud-guard, opposite flexible flap 12.

Advantageously, I make use of a tube which is flat at least for the portion thereof housed in the mud-guard, so as to occupy a minimum space between the mud-guard and the tire. Thus, the ends of the tube can remain circular, which permits of fitting its upper end in a cast structure (muffler 8 or exhaust pipe 13). In its lower end it is possible to house an anti-drip device (Fig. 3) constituted, for instance, by a sleeve 16 engaged with a tight fit in this end and the lower edge of which is bevelled so as to be able to collect a certain amount of oil drops which may run along tube 9 when the engine is stopped, in a garage or the like.

When the upper end of tube 9 is connected rigidly with box 8, a relatively large distance may be left between said box and the first fixation means 11, which thus gives this portion of tube 9, in view of its flat shape, a relatively great elasticity. If the tube is correctly bent, it may act as a spring serving constantly to urge the engine downwardly so as to ensure contact between roller 7 and the tire of wheel 4. When it is desired to move the roller away from the tire, the engine is pivoted upwardly about axis 6 (roller 7 and the parts adjacent thereto passing freely through the hole 10a of mud-guard 10) and an effort is thus exerted against the action of tube 9. This tube may be made of a single piece, which eliminates risks of leakage while enabling the engine to oscillate about its axis 6 and ensuring a suitable contact between the roller and the tire.

Figure 4:
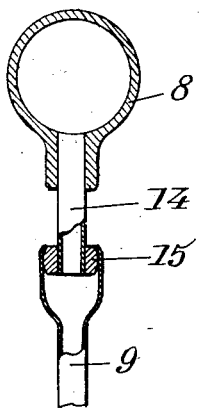
Fig. 4 shows, in vertical section and on a larger scale, a portion of this device, made according to a modification.

In the modification according to Fig. 4, muffler 8 includes a tubular connection 14 fitted with a kind of ball 15 engaged in the upper and circular end of the tube 9 to form a kind of ball and socket joint permitting relative displacements of the engine about its fixed axis 6, the axis of this joint preferably coinciding substantially with this axis 6.

Figure 5:
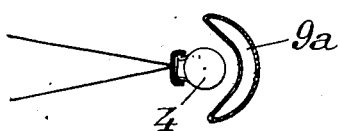
Fig. 5 shows, similarly to Fig. 2, another modification of this device.

In the modification shown by Fig. 5, I use a flat tube 9a of sufficiently large dimensions bent transversely so as to constitute a mud-guard.

In both cases, between the upper and lower ends of exhaust tube 9, a considerable space is available to house insonorous walls and baffles owing to which the inside of the tube can be used as a silencer or muffler.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, a bicycle including a frame for supporting a rear wheel, a front fork pivoted in said frame, a front wheel journalled in said front fork, an internal combustion engine for driving said front wheel pivoted to said fork about a horizontal axis, a roller driven by said engine adapted to run on the periphery of said wheel, a mud-guard of U-shaped section rigid with said fork surrounding a portion of said front wheel and extending rearwardly to a short distance from the ground, and a tube running along the inner wall of said mud-guard and fixed thereto, the top end portion of said tube extending upwardly through said mud-guard and being connected to the exhaust of said engine, and the bottom end of said tube being open to the atmosphere for the outflow of the exhaust gases.

2. A combination according to claim 1 in which said top end portion of the tube is elastically biased to urge said engine downwardly so as to tend to apply said roller against said wheel.

MARCEL MENNESSON.

References Cited in the file of this patent
UNITED STATES PATENTS

| Number | Name | Date |
| --- | --- | --- |
| 705,357 | Keating | July 22, 1902 |
| 882,068 | Keller | Mar. 17, 1908 |
| 2,031,881 | Evinrude | Feb. 25, 1936 |
| 2,231,586 | Millers | Feb. 11, 1941 |
| 2,377,389 | Waters | June 5, 1945 |